United States Patent
Lee et al.

(10) Patent No.: US 9,168,824 B2
(45) Date of Patent: Oct. 27, 2015

(54) POWER TRANSMISSION SYSTEM OF HYBRID ELECTRIC VEHICLE

(71) Applicant: Hyundai Motor Company, Seoul (KR)

(72) Inventors: Hee Ra Lee, Anyang-si (KR); SeongGon Byun, Anyang-si (KR); Hyunsup Kim, Seoul (KR); Baekyu Kim, Suwon-si (KR); Insup Kim, Anyang-si (KR); Seok Joon Kim, Yongin-si (KR); Chulmin Ahn, Busan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/500,496

(22) Filed: Sep. 29, 2014

(65) Prior Publication Data
US 2015/0119191 A1    Apr. 30, 2015

(30) Foreign Application Priority Data
Oct. 28, 2013 (KR) .................. 10-2013-0128656

(51) Int. Cl.
| | |
|---|---|
| F16H 3/72 | (2006.01) |
| B60K 6/365 | (2007.10) |
| B60K 6/387 | (2007.10) |
| B60K 6/445 | (2007.10) |
| B60K 6/38 | (2007.10) |
| F16H 37/10 | (2006.01) |

(52) U.S. Cl.
CPC ............... B60K 6/365 (2013.01); B60K 6/387 (2013.01); B60K 6/445 (2013.01); *B60K 2006/381* (2013.01); *F16H 2037/102* (2013.01); *F16H 2200/2007* (2013.01); *Y10S 903/902* (2013.01)

(58) Field of Classification Search
None
See application file for complete search history.

(56) References Cited

U.S. PATENT DOCUMENTS

| | | | |
|---|---|---|---|
| 7,108,087 B2 | 9/2006 | Imai | |
| 7,347,798 B2* | 3/2008 | Raghavan et al. | 475/5 |
| 7,927,244 B2 | 4/2011 | Iwanaka et al. | |
| 8,162,084 B2* | 4/2012 | Iwanaka et al. | 180/65.235 |
| 8,241,166 B2* | 8/2012 | Sung | 475/280 |
| 8,303,445 B2* | 11/2012 | Kim et al. | 475/5 |
| 8,308,593 B2* | 11/2012 | Kumazaki et al. | 475/5 |
| 8,449,420 B2* | 5/2013 | Seo et al. | 475/5 |
| 8,672,789 B2* | 3/2014 | Park | 475/5 |
| 2011/0183801 A1* | 7/2011 | Ando | 475/5 |
| 2011/0245003 A1* | 10/2011 | Takami | 475/5 |

FOREIGN PATENT DOCUMENTS

KR    10-2010-0003747 A    1/2010

* cited by examiner

*Primary Examiner* — Dirk Wright
(74) *Attorney, Agent, or Firm* — Morgan, Lewis & Bockius LLP

(57) ABSTRACT

A power transmission system of a hybrid electric vehicle may include an input shaft receiving torque of an engine, a first planetary gear set having at least three rotation elements, a second planetary gear set having at least three rotation elements, a clutch selectively connecting two rotation elements among the at least three rotation elements of the second planetary gear set, a brake selectively connecting a rotation element of the second planetary gear set to the transmission housing, and an output gear connected to a second motor/generator and the a rotation element of the second planetary gear set.

15 Claims, 3 Drawing Sheets

FIG. 2

| EV mode | | | CL | BK | note |
|---|---|---|---|---|---|
| Series | | | X | X | if necessary, series mode can be used |
| HEV mode | Parallel | 1:1 | X | X | |
| | | OD | O | X | |
| | | | X | O | |

POWER TRANSMISSION SYSTEM OF HYBRID ELECTRIC VEHICLE

CROSS-REFERENCE TO RELATED APPLICATION

The present application claims priority to Korean Patent Application No. 10-2013-0128656 filed Oct. 28, 2013, the entire contents of which are incorporated herein for all purposes by this reference.

BACKGROUND OF THE INVENTION

1. Field of the Invention

The present invention relates to a power transmission system of a hybrid electric vehicle. More particularly, the present invention relates to a power transmission system of a hybrid electric vehicle that can be used variably as a hybrid electric vehicle of series type and a hybrid electric vehicle of parallel type by using one engine and two motor/generators.

2. Description of Related Art

Environmentally-friendly technique of vehicles is a very important technique on which survival of future motor industry is dependent. Vehicle makers are focusing on development of environmentally-friendly vehicles so as to meet environment and fuel consumption regulations.

Therefore, each vehicle maker is developing an electric vehicle (EV), a hybrid electric vehicle (HEV), a fuel cell electric vehicle (FCEV) and so on as future vehicles.

Since the future vehicles have various technical limitations such as weight and cost, the vehicle makers are paying attention to a hybrid electric vehicle in order to meet exhaust gas regulations and improve fuel economy and compete for commercializing the hybrid electric vehicle.

The hybrid electric vehicle is a vehicle using two or more power sources, and a gasoline engine or a diesel engine using fossil fuel and a motor/generator driven by electrical energy are used as the power sources of the hybrid electric vehicle.

The hybrid electric vehicle uses the motor/generator having relatively better low-speed torque characteristics as a main power source at a low-speed and uses an engine having relatively better high-speed torque characteristics as a main power source at a high-speed.

Since the hybrid electric vehicle stops operation of the engine using the fossil fuel and uses the motor/generator at a low-speed region, fuel consumption may be improved and exhaust gas may be reduced.

The power transmission system of a hybrid electric vehicle is classified into a single-mode type and a multi-mode type.

A torque delivery apparatus such as clutches and brakes for shift control is not necessary, but fuel consumption is high due to deterioration of efficiency at a high-speed region and an additional torque multiplication device is required for being applied to a large vehicle according to the single-mode type.

Since the multi-mode type has high efficiency at the high-speed region and is able to multiply torque autonomously, the multi-mode type can be applied to a full size vehicle.

Therefore, the multi-mode type instead of the single-mode type is applied as the power transmission system of a hybrid electric vehicle and is also under continuous investigation.

The power transmission system of the multi-mode type includes a plurality of planetary gear sets, a plurality of motor/generators operated as a motor and/or a generator, a plurality of torque delivery apparatus controlling rotation elements of the planetary gear sets, and a battery used as a power source of the motor/generators.

The power transmission system of the multi-mode type has different operating mechanisms depending on connections of the planetary gear sets, the motor/generators, and the torque delivery apparatus.

In addition, the power transmission system of the multi-mode type has different features such as durability, power delivery efficiency, and size depending on the connections of the planetary gear sets, the motor/generators, and the torque delivery apparatus. Therefore, designs for the connection structure of the power transmission system of a hybrid electric vehicle are also under continuous investigation to achieve robust and compact power transmission system having no power loss.

The above information disclosed in this Background section is only for enhancement of understanding of the background of the invention and therefore it may contain information that does not form the prior art that is already known in this country to a person of ordinary skill in the art.

BRIEF SUMMARY

Various aspects of the present invention are directed to providing a power transmission system of a hybrid electric vehicle having advantages of being used variably as a hybrid electric vehicle of series type and a hybrid electric vehicle of parallel type by using one engine and two motor/generators.

In addition, various aspects of the present invention has are directed to providing a power transmission system of a hybrid electric vehicle having further advantages of achieving direct-coupling shift-speed and overdrive shift-speed at a parallel mode.

In one aspect of the present invention, a power transmission system of a hybrid electric vehicle may include an input shaft receiving torque of an engine, a first planetary gear set including at least three rotation elements, wherein a first rotation element is directly connected to the input shaft, a second rotation element is directly connected to a first motor/generator, and a third rotation element is fixed to a transmission housing, a second planetary gear set including at least three rotation elements, wherein a first rotation element thereof is connected to the first rotation element of the first planetary gear set directly connected to the input shaft, a second rotation element thereof is directly connected to a second motor/generator, and a third rotation element thereof is selectively connected to a transmission housing, a clutch selectively connecting two rotation elements among the at least three rotation elements of the second planetary gear set, a brake selectively connecting the third rotation element of the second planetary gear set to the transmission housing, and an output gear connected to the second motor/generator and the second rotation element of the second planetary gear set.

The first rotation element of the first planetary gear set is a first planet carrier, the second rotation element of the first planetary gear set is a first ring gear, and the third rotation element of the first planetary gear set is a first sun gear, and the first rotation element of the second planetary gear set is a second planet carrier, the second rotation element of the second planetary gear set is a second ring gear, and the third rotation element of the second planetary gear set is a second sun gear.

The first rotation element of the first planetary gear set is a first planet carrier, the second rotation element of the first planetary gear set is a first sun gear, and the third rotation element of the first planetary gear set is a first ring gear, and the first rotation element of the second planetary gear set is a second planet carrier, the second rotation element of the second planetary gear set is a second ring gear, and the third rotation element of the second planetary gear set is a second sun gear.

The clutch is disposed between the first rotation element and the second rotation element of the second planetary gear set.

The power transmission system may further include a torsional damper disposed between the engine and the input shaft.

In another aspect of the present invention, a power transmission system of a hybrid electric vehicle may include an input shaft receiving torque of an engine, a first planetary gear set including a first sun gear fixed to a transmission housing, a first planet carrier directly connected to the input shaft, and a first ring gear directly connected to a first motor/generator, a second planetary gear set including a second sun gear selectively connected to the transmission housing, a second planet carrier directly connected to the first planet carrier, and a second ring gear directly connected to a second motor/generator, a clutch selectively direct-coupling the second planetary gear set, and an output gear directly connected to the second ring gear and the second motor/generator.

The clutch is disposed between the second planet carrier and the second ring gear.

The power transmission system may further include a brake selectively connecting the second sun gear with the transmission housing, wherein each of the first planetary gear set and the second planetary gear set is a single pinion planetary gear set, and wherein a torsional damper disposed between the engine and the input shaft.

In further another aspect of the present invention, a power transmission system of a hybrid electric vehicle may include an input shaft receiving torque of an engine, a first planetary gear set including a first ring gear fixed to a transmission housing, a first planet carrier directly connected to the input shaft, and a first sun gear directly connected to a first motor/generator, a second planetary gear set including a second sun gear selectively connected to the transmission housing, a second planet carrier directly connected to the first planet carrier, and a second ring gear directly connected to a second motor/generator, a clutch selectively direct-coupling the second planetary gear set, and an output gear directly connected to the second ring gear and the second motor/generator.

The clutch is disposed between the second planet carrier and the second ring gear.

The power transmission system may further include a brake selectively connecting the second sun gear with the transmission housing, wherein each of the first planetary gear set and the second planetary gear set is a single pinion planetary gear set, and wherein a torsional damper may be disposed between the engine and the input shaft.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart of frictional elements at each mode applied to the power transmission system according to various exemplary embodiments of the present invention.

Figure 1:
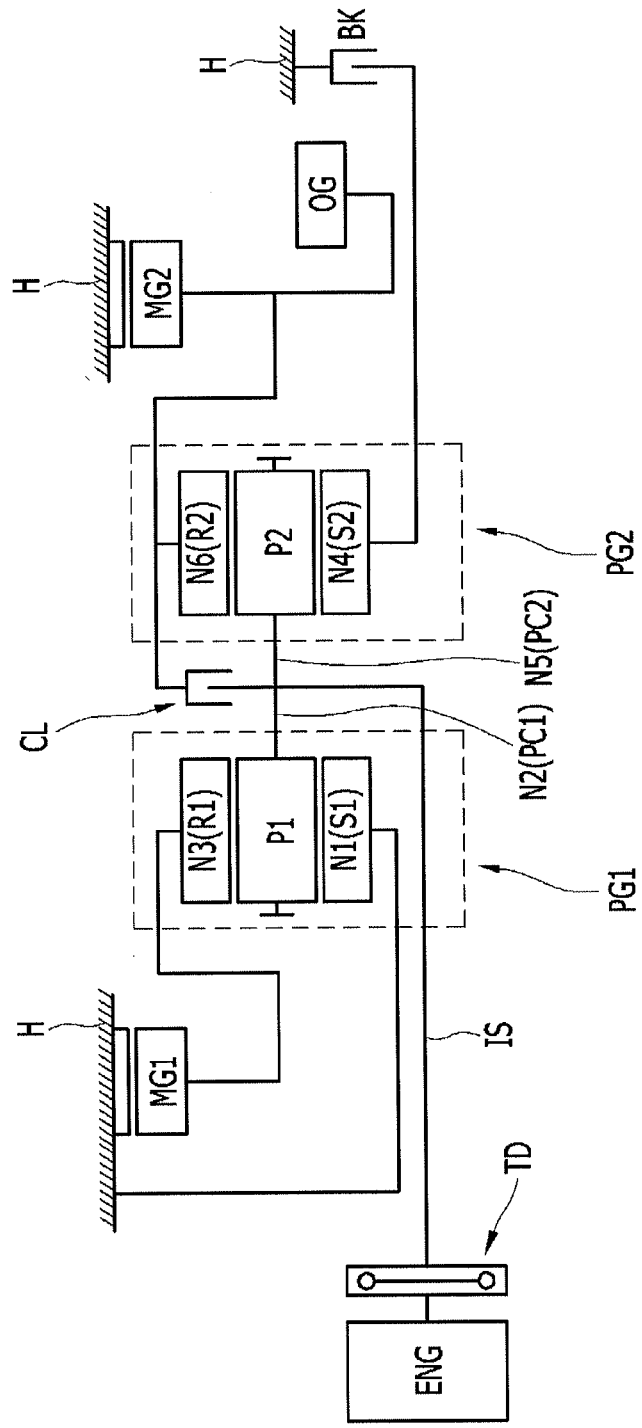
FIG. 1 is a schematic diagram of a power transmission system according to various exemplary embodiments of the present invention.

Reference numerals set forth in the Drawings include reference to the following elements as further discussed below, It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described with reference to the accompanying drawings so that those skilled in the Field of the Invention to which the present invention pertains may carry out the exemplary embodiment.

Description of components that are not necessary for explaining the present exemplary embodiment will be omitted, and the same constituent elements are denoted by the same reference numerals in this specification.

In the detailed description, ordinal numbers are used for distinguishing constituent elements having the same terms, and have no specific meanings.

FIG. 1 is a schematic diagram of a power transmission system according to the first exemplary embodiment of the present invention.

Referring to FIG. 1, a power transmission system of a hybrid electric vehicle according to the first exemplary embodiment of the present invention uses an engine ENG and first and second motor/generators MG1 and MG2 as power sources. The power transmission system changes torque of the engine ENG transmitted through an input shaft IS and torques of the first and second motor/generators MG1 and MG2 according to running state of a vehicle and outputs the changed torque through an output gear OG.

The power transmission system includes the input shaft IS, first and second planetary gear sets PG1 and PG2, a clutch CL, a brake BK, and the output gear OG.

A torsional damper TD is disposed between the input shaft IS and an output side of the engine ENG and absorbs torsional vibration of the torque output from the engine ENG.

One rotation element of the first planetary gear set PG1 is directly connected to one rotation element of the second planetary gear set PG2, and another rotation element of the first planetary gear set PG1 and another rotation element of the second planetary gear set PG2 are connected respectively to the first motor/generator MG1 and the second motor/generator MG2.

The first motor/generator MG1 and the second motor/generator MG2 are independent power sources and are operated as a motor and a generator.

That is, the first motor/generator MG1 is operated as a motor for supplying torque to the another rotation element of the first planetary gear set PG1 or as a generator for generating electricity by torque of the another rotation element.

The second motor/generator MG2 is operated as a motor for supplying torque to the another rotation element of the second planetary gear set PG2 or as a generator for generating electricity by torque of the another rotation element.

For this purpose, a stator of the first motor/generator MG1 and a stator of the second motor/generator MG2 are fixed to a transmission housing H, and a rotor of the first motor/generator MG1 and a rotor of the second motor/generator MG2 are connected respectively to the another rotation element of the first planetary gear set PG1 and the another rotation element of the second planetary gear set PG2.

The clutch CL selectively connects two rotation elements among three rotation elements of the second planetary gear set PG2 so as for the second planetary gear set PG2 to become a direct-coupling state.

The brake BK selectively connects and fixes any one rotation element of the second planetary gear set PG2 to the transmission housing H.

The clutch CL is a friction member selectively connecting any rotation element with another rotation element and the brake BK is a friction member selectively connecting any rotation element to a fixed element (e.g., transmission housing). The friction members may be a conventional multi-plate friction element of wet type that is operated by hydraulic pressure, but are not limited thereto.

The power transmission system of the hybrid electric vehicle according to the first exemplary embodiment of the present invention will be described in further detail.

The first planetary gear set PG1 is a single pinion planetary gear set, and includes a first rotation element N1 being a first sun gear S1, a second rotation element N2 being a first planet carrier PC1 rotatably supporting a first pinion P1 that is externally meshed with the first sun gear S1, and a third rotation element N3 being a first ring gear R1 that is internally meshed with the first pinion P1.

The second planetary gear set PG2 is a single pinion planetary gear set, and includes a fourth rotation element N4 being a second sun gear S2, a fifth rotation element N5 being a second planet carrier PC2 rotatably supporting a second pinion P2 that is externally meshed with the second sun gear S2, and a sixth rotation element N6 being a second ring gear R2 that is internally meshed with the second pinion P2.

The first planet carrier PC1 of the second rotation element N2 and the second planet carrier PC2 of the fifth rotation element N5 are directly connected to each other and are connected to the input shaft IS, the second planet carrier PC2 of the fifth rotation element N5 is selectively connected to the second ring gear R2 of the sixth rotation element N6, and the second ring gear R2 of the sixth rotation element N6 is directly connected to the output gear OG that is an output member.

The input shaft IS receives the torque from the engine ENG, and the output gear OG is the output member and transmits driving torque to a driving wheel through a final reduction gear and a differential apparatus.

In addition, the first ring gear R1 of the third rotation element N3 is directly connected to the first motor/generator MG1 such that the first motor/generator MG1 is operated as the motor driving the first ring gear R1 or as the generator.

In addition, the second ring gear R2 of the sixth rotation element N6 is directly connected to the second motor/generator MG2 such that the second motor/generator MG2 is operated as the motor driving the second ring gear R2 or the generator.

The clutch CL is disposed between the second planet carrier PC2 of the fifth rotation element N5 and the second ring gear R2 of the sixth rotation element N6 so as to selectively connect the second planet carrier PC2 with the second ring gear R2. Therefore, the clutch CL causes the second planetary gear set PG2 to become the direct-coupling state selectively.

The brake BK is disposed between the second sun gear S2 of the fourth rotation element N4 and the transmission housing H so as to selectively connect the second sun gear S2 with the transmission housing H. Therefore, the second sun gear S2 is operated as a fixed element selectively.

FIG. 2 is an operational chart of frictional elements at each mode applied to a power transmission system according to the first exemplary embodiment of the present invention.

Referring to FIG. 2, neither of the clutch CL and the brake BK is operated at an electric vehicle (EV) mode.

Since the engine ENG is stopped and the vehicle is driven by the second motor/generator MG2, high efficiency similar to what the electric vehicle can achieve may be secured at a low speed.

If the engine ENG connected to the first planetary gear set PG1 is started by the first motor/generator MG1 at this state, the first motor/generator MG1 generates electrical energy by the torque of the engine ENG and supplies the electric energy to the second motor/generator MG2 or charges a battery. That is, a hybrid electric vehicle (HEV) mode of series type may be achieved.

At this time, since the clutch CL is released, the torques of the engine ENG and the first motor/generator MG1 are prevented from being transmitted to the output gear OG directly. Excellent fuel economy may be secured at city driving of middle/low speed under the HEV mode of series type.

At the HEV mode of series type, rotation speed of the first motor/generator MG1 is faster than that of the engine ENG by a gear ratio of the first planetary gear set PG1, thereby reducing maximum torque of the first motor/generator MG1. Therefore, excellent generating efficiency may be secured by the torque of the engine ENG.

In addition, since the electric energy generated by the first motor/generator MG1 can be supplied to the second motor/generator MG2 as the power source at the HEV mode of series type, high-capacity battery is not necessary to drive the high-capacity second motor/generator MG2. Therefore, capacity of the battery may be reduced.

In addition, if any one of the clutch CL or the brake BK is operated, a HEV mode of parallel type is achieved, in which the vehicle is driven by the torques of the engine ENG and the second motor/generator MG2.

Excellent driving efficiency may be secured at middle/high speed or constant speed under the HEV mode of parallel type.

The power transmission system of the hybrid electric vehicle an according to the exemplary embodiment of the present invention can secure high efficiency similar to a reduce can achieve at the EV mode. In addition, since the HEV mode of series type and the HEV mode of parallel type are selectively used considering optimum efficiency regions of the HEV mode of series type and the HEV mode of parallel type, power delivery efficiency similar to an electric vehicle can achieve may be secured at a charge depleting CD region of a plug-in hybrid electric vehicle (PHEV) and the highest fuel mileage may be secured.

In addition, since the HEV mode of series type and the HEV mode of parallel type are used to cause optimum driving of the engine ENG at a charge sustaining (CS) region, the system may achieve the highest fuel economy and be applied simultaneously to the PHEV and the HEV.

As described above, the power transmission system of the hybrid electric vehicle according to the first exemplary embodiment of the present invention releases the clutch CL and stops the engine at the EV mode. Therefore, unnecessary mechanical loss may be minimized. Therefore, power delivery efficiency similar to the reducer can achieve may be secured.

In addition, since the power transmission system of a hybrid electric vehicle according to the first exemplary embodiment of the present invention can separate running of the vehicle from the engine ENG and the first motor/generator MG1 at the EV mode, structural limitations to driving speed do not exist at the EV mode. In addition, since the engine ENG is operated independently from the vehicle by the clutch CL at the HEV mode of series type, the driving speed is not limited by the second motor/generator MG2.

In addition, since the power transmission system of the hybrid electric vehicle according to the first exemplary embodiment of the present invention can achieve the HEV mode of series type, the first motor/generator MG1 can supply electric energy for driving the second motor/generator MG2 according to torque of the engine ENG. Therefore, capacity of the battery may be minimized.

In addition, the power transmission system of the hybrid electric vehicle according to the first exemplary embodiment of the present invention supports two shift-speeds at the HEV mode of parallel type, the engine ENG may be driven efficiently and fuel consumption may be curtailed.

Figure 3:
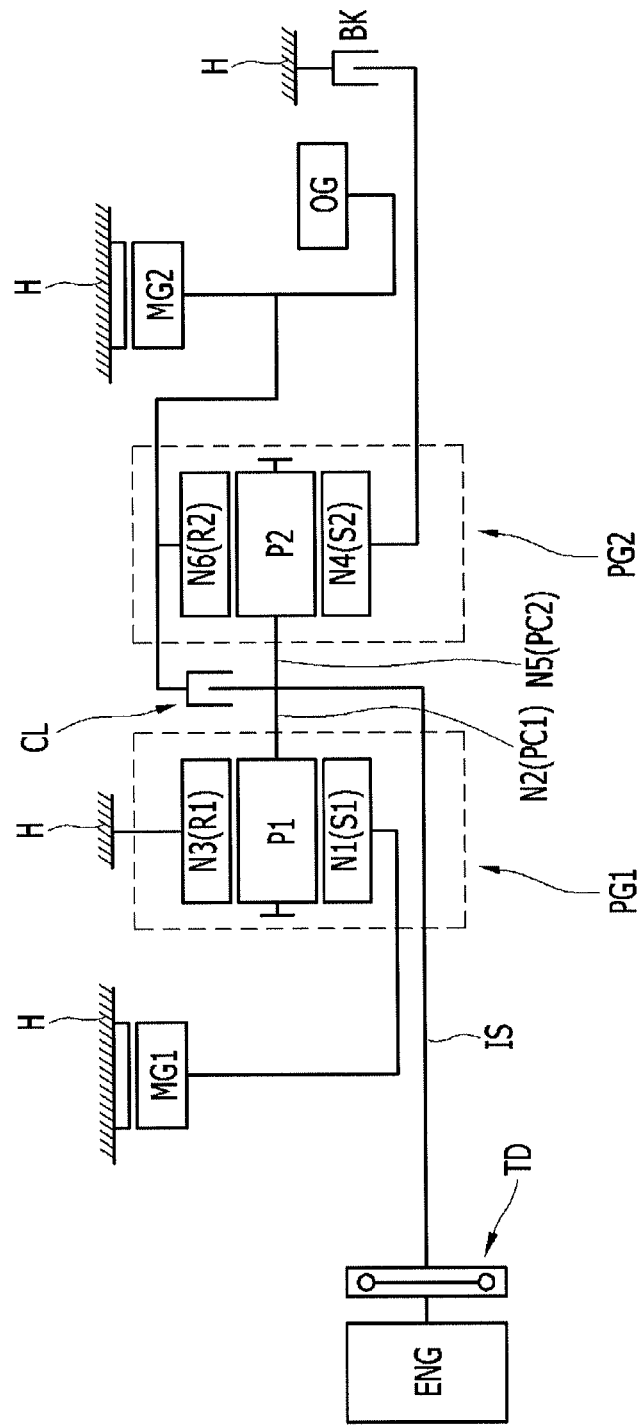
FIG. 3 is a schematic diagram of a power transmission system according to various exemplary embodiments of the present invention.

FIG. 3 is a schematic diagram of a power transmission system according to the second exemplary embodiment of the present invention.

Referring to FIG. 3, although the first motor/generator MG1 is directly connected to the first ring gear R1 of the third rotation element N3 and the first sun gear S1 of the first rotation element N1 is operated as the fixed element in the first exemplary embodiment of the present invention, the first motor/generator MG1 is directly connected to the first sun gear S1 of the first rotation element N1 and the first ring gear R1 of the third rotation element N3 is operated as the fixed element in the second exemplary embodiment.

Since functions and operation of the second exemplary embodiment of the present invention are the same as those of the first exemplary embodiment, detailed description thereof will be omitted.

Since the vehicle is driven by the second motor/generator at the EV mode in a stopped state of the engine according to the exemplary embodiments of the present invention, unnecessary mechanical loss may be minimized and power delivery efficiency similar to the reducer can achieve may be secured.

In addition, since running of the vehicle can be separated from the engine and the first motor/generator at the EV mode, structural limitations to driving speed do not exist at the EV mode.

In addition, since the engine is operated independently from the vehicle by the clutch at the HEV mode of series type, the driving speed is not limited by the second motor/generator and the first motor/generator can supply electric energy for driving the second motor/generator according to torque of the engine. Therefore, capacity of the battery may be minimized.

In addition, since two shift-speeds are achieved at the HEV mode of parallel type, the engine may be driven efficiently and fuel consumption may be curtailed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A power transmission system of a hybrid electric vehicle comprising:
    an input shaft receiving torque of an engine;
    a first planetary gear set including at least three rotation elements, wherein a first rotation element is directly connected to the input shaft, a second rotation element is directly connected to a first motor/generator, and a third rotation element is fixed to a transmission housing;
    a second planetary gear set including at least three rotation elements, wherein a first rotation element thereof is connected to the first rotation element of the first planetary gear set directly connected to the input shaft, a second rotation element thereof is directly connected to a second motor/generator, and a third rotation element thereof is selectively connected to a transmission housing;
    a clutch selectively connecting two rotation elements among the at least three rotation elements of the second planetary gear set;
    a brake selectively connecting the third rotation element of the second planetary gear set to the transmission housing; and
    an output gear connected to the second motor/generator and the second rotation element of the second planetary gear set.

2. The power transmission system of claim 1,
    wherein the first rotation element of the first planetary gear set is a first planet carrier, the second rotation element of the first planetary gear set is a first ring gear, and the third rotation element of the first planetary gear set is a first sun gear, and
    wherein the first rotation element of the second planetary gear set is a second planet carrier, the second rotation element of the second planetary gear set is a second ring gear, and the third rotation element of the second planetary gear set is a second sun gear.

3. The power transmission system of claim 1,
wherein the first rotation element of the first planetary gear set is a first planet carrier, the second rotation element of the first planetary gear set is a first sun gear, and the third rotation element of the first planetary gear set is a first ring gear, and
wherein the first rotation element of the second planetary gear set is a second planet carrier, the second rotation element of the second planetary gear set is a second ring gear, and the third rotation element of the second planetary gear set is a second sun gear.

4. The power transmission system of claim 1, wherein the clutch is disposed between the first rotation element and the second rotation element of the second planetary gear set.

5. The power transmission system of claim 1, further comprising a torsional damper disposed between the engine and the input shaft.

6. A power transmission system of a hybrid electric vehicle comprising:
an input shaft receiving torque of an engine;
a first planetary gear set including a first sun gear fixed to a transmission housing, a first planet carrier directly connected to the input shaft, and a first ring gear directly connected to a first motor/generator;
a second planetary gear set including a second sun gear selectively connected to the transmission housing, a second planet carrier directly connected to the first planet carrier, and a second ring gear directly connected to a second motor/generator;
a clutch selectively direct-coupling the second planetary gear set; and
an output gear directly connected to the second ring gear and the second motor/generator.

7. The power transmission system of claim 6, wherein the clutch is disposed between the second planet carrier and the second ring gear.

8. The power transmission system of claim 7, further comprising a brake selectively connecting the second sun gear with the transmission housing.

9. The power transmission system of claim 7, wherein each of the first planetary gear set and the second planetary gear set is a single pinion planetary gear set.

10. The power transmission system of claim 7, further comprising a torsional damper disposed between the engine and the input shaft.

11. A power transmission system of a hybrid electric vehicle comprising:
an input shaft receiving torque of an engine;
a first planetary gear set including a first ring gear fixed to a transmission housing, a first planet carrier directly connected to the input shaft, and a first sun gear directly connected to a first motor/generator;
a second planetary gear set including a second sun gear selectively connected to the transmission housing, a second planet carrier directly connected to the first planet carrier, and a second ring gear directly connected to a second motor/generator;
a clutch selectively direct-coupling the second planetary gear set; and
an output gear directly connected to the second ring gear and the second motor/generator.

12. The power transmission system of claim 11, wherein the clutch is disposed between the second planet carrier and the second ring gear.

13. The power transmission system of claim 11, further comprising a brake selectively connecting the second sun gear with the transmission housing.

14. The power transmission system of claim 11, wherein each of the first planetary gear set and the second planetary gear set is a single pinion planetary gear set.

15. The power transmission system of claim 11, further comprising a torsional damper disposed between the engine and the input shaft.

* * * * *